T. FAIRCHILD & C. HAZELTINE.
Curry-Combs.

No. 215,110.                Patented May 6, 1879.

Witnesses:
George B. Tinker
John B. F. Fregeau

Inventors:
Truman Fairchild,
Channing Hazeltine.
per Wiswell & Gilman,
Attorneys.

UNITED STATES PATENT OFFICE.

TRUMAN FAIRCHILD AND CHANNING HAZELTINE, OF DERBY, VERMONT.

IMPROVEMENT IN CURRY-COMBS.

Specification forming part of Letters Patent No. 215,110, dated May 6, 1879; application filed February 8, 1879.

*To all whom it may concern:*

Be it known that we, TRUMAN FAIRCHILD and CHANNING HAZELTINE, of Derby, in the county of Orleans and State of Vermont, have invented certain new and useful Improvements in Combined Curry-Comb, Scraper, and Cleaner; and we do hereby declare that the following is a full, clear, and exact description of the invention, which will enable others skilled in the art to which it appertains to make and use the same, reference being had to the accompanying drawings, and to letters of reference marked thereon, which form a part of this specification.

The object of our invention is to provide a handy and convenient tool, so constructed as to be adapted to a variety of uses in the care of horses and cattle in the stable.

Figure 1:
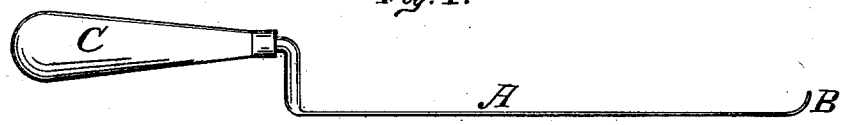
Figure 2:
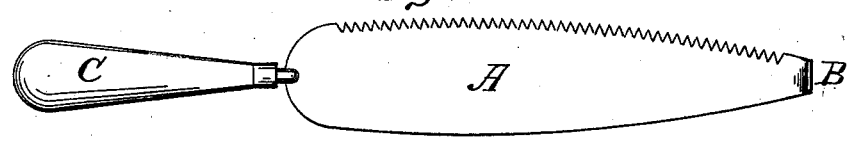

Figure 1 represents an elevation of our combined curry-comb, scraper, and cleaning blade. Fig. 2 is a plan view of the same.

A is the blade, B the hook, and C the handle.

One edge of the blade A is serrated, for use as a curry-comb, the opposite edge being made smooth, to serve as a scraper, for scraping sweat and mud from horses or cattle.

As will be seen from Fig. 1, the handle C is parallel with, but not in the same plane with, that of the blade A, thus enabling the operator to use the implement without soiling the hands.

The hook B is used for cleaning horses' feet, or for removing manure-tags from the flanks or sides of cattle.

The handle we propose to make of wood, and the blade of tempered steel or hard-rolled brass; but do not confine ourselves to the attachment of the same to the blade by an offset, as shown.

We are aware that, broadly, it is old to provide a curve-bladed curry-comb with a serrated and a plain edge, and the forward edge or end with a hook.

Having thus described our invention, we claim as new and desire to secure by Letters Patent—

The curry-comb and scraper consisting, essentially, of the straight blade A, with one edge serrated and the other edge adapted to serve as a scraper, and its forward end provided with a hook, B, and its other end with a handle, substantially as shown and described.

In testimony that we claim the foregoing as our own we affix our signatures in presence of two witnesses.

TRUMAN FAIRCHILD.
CHANNING HAZELTINE.

Witnesses:
 W. H. GILMAN,
 A. G. LITTLE.